Aug. 11, 1964 — E. R. WEATHERALL — 3,143,840
GRASS KNOCKER FOR COTTON PICKER
Filed May 31, 1961
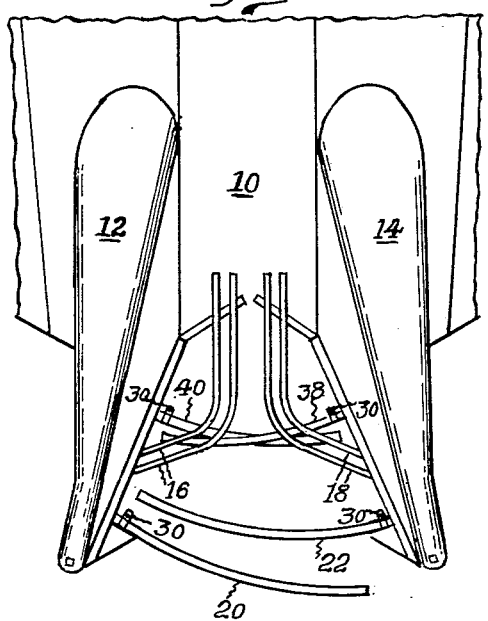
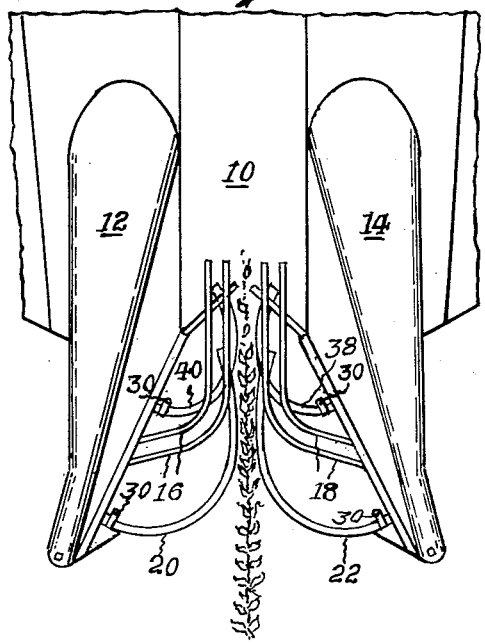
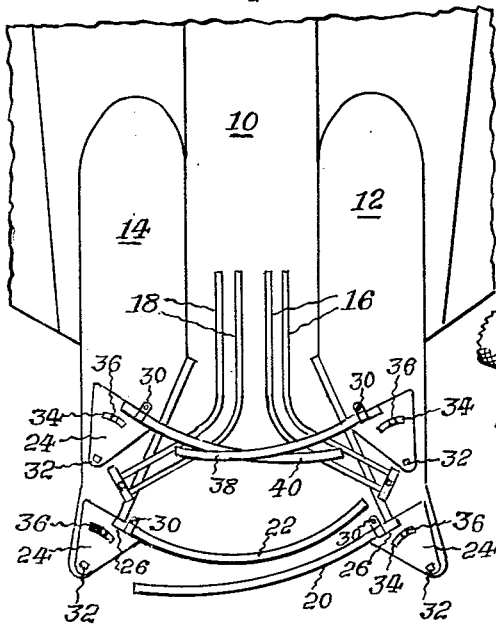
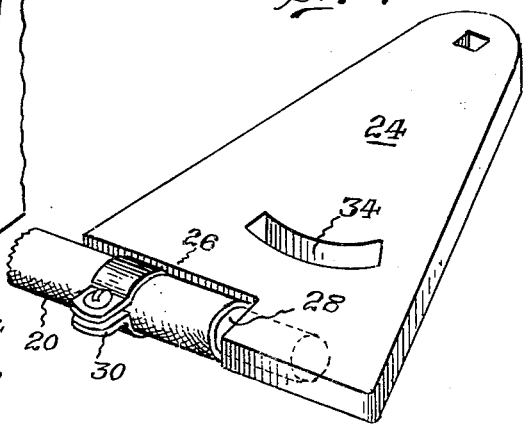
INVENTOR.
Edwin R. Weatherall.
BY
Mason, Mason & Albright
ATTORNEYS.

United States Patent Office 3,143,840
Patented Aug. 11, 1964

3,143,840
GRASS KNOCKER FOR COTTON PICKER
Edwin R. Weatherall, Tutwiler, Miss., assignor of one-tenth to C. Sidney Carlton, and of one-tenth to R. H. Henderson, both of Sumner, Miss.
Filed May 31, 1961, Ser. No. 113,899
7 Claims. (Cl. 56—28)

This invention is for use with a mechanical cotton picking machine, and may be attached to existing machines or form a part of new machines.

The principal object of the invention is to provide a novel device for pressing down the grass and weeds, and other noxious vegetation, ahead of the cotton picker so that only the cotton plant itself enters the spindle slot of the picker and passes through the spindles, thus providing a better grade of cotton.

A further object is to provide means for pressing down grass forming part of a cotton picking machine which as it travels over the ground causes the noxious vegetation to be pressed down while permitting the cotton plants themselves to enter the spindle slot of the picker in the ordinary manner.

An additional object is to provide hydraulic hose members which extend generally in the direction of each other and which may be readily attached to the shields of the cotton picking machine.

A further object is to provide flexible hose members which extend across the slot formed between the shields of a cotton picking machine which serve to firmly press the noxious vegetation towards the ground as the machine passes over the ground while at the same time permitting the cotton stalks or plants to pass unmolested into the V-shaped opening between the shields of the cotton picking machine.

Yet another object is to provide means for individually adjustably mounting the plates which support each flexible hose on the underside of a shield.

Other objects will appear hereinafter throughout the specification.

In the drawings:

FIGURE 1 is a top plan broken away view of the forward portion of a cotton picking machine showing the device in position for operation;

FIGURE 2 is a similar view but shows the action of the flexible hoses as the machine passes over the row of cotton plants;

FIGURE 3 is a diagrammatic bottom plan view similar to the plan view illustrated in FIGURE 1; and FIGURE 4 is an enlarged detail of one of the hose supporting plates and a portion of the hose supported thereby.

Referring now to the drawings, the numeral 10 indicates the forward portion of a conventional cotton picking machine. Extending forwardly therefrom are the shields or guides indicated by reference numerals 12 and 14. The forward portion of the machine is provided with spring devices indicated by reference numerals 16 and 18, these being shown in pairs. Usually the rear ends of these spring devices are free.

The foregoing relates to the conventional cotton picking machine now on the market. It has been found that even with the spring devices 16 and 18 grass finds its way in with the cotton plants which are gathered between the two shields and passed rearwardly into the spindle slot. As usual in machines of this type, the spindles in the slot revolve and engage the cotton in the opened boll of the cotton plant and pick the cotton. While this is occurring in the usual machine, the other vegetation, such as noxious weeds, also passes through the spindle slot.

In order to avoid this action, I provide a means for gently and firmly pressing the noxious vegetation toward the ground as the machine passes thereover, the means being of insufficient force to materially affect the position of the standing cotton plants, so that they pass into the spindle slot while the grass, noxious weeds, etc. are held to the ground. This means comprises a pair of hose members, such as hydraulic rubber hose of the type used for conveying liquids, preferably about one-half inch in diameter. Hydraulic hose is used because its stiffness is ideally suited to the use contemplated herein. As shown in the drawings, the hose members are indicated by reference numerals 20 and 22. One end of the hose 20 is removably affixed to the plate 24. This is accomplished for each of the hoses by providing a cut-out portion 26 and a metallic stud member or pin 28 over which one end of the hose is sleeved. The hose is held in position by any suitable means, such as an ordinary hose clamp, indicated by reference number 30. A pivoted means such as a pin 32 pivotally connects the plate 24 to the underside of the shield 12. The plate may be pivotally adjusted by means of the slot 34 and a pin or screw bolt 36 which may be tightened to hold the plate in pivotally adjusted position.

All of the hoses illustrated in the several figures are similarly mounted and hence will not be further described.

However, it should be noted that while long weeds will be held down for a sufficient time by the hose members 20 and 22, short weeds which are momentarily held down by these hoses have a tendency to spring upright again as they are approached by the revolving spindles in the spindle slot. While it is not always necessary to provide a pair of additional hose members, such have been indicated, however, by reference numerals 38 and 40. These hose members are located rearwardly of the hose members 20 and 22 and engage shorter weeds and grasses so as to depress them immediately before the cotton enters the spindle slot. Each hose member 38 and 40 is mounted on a plate, as indicated in FIGURE 3, which is similar in all respects to the plates which mount the hose members 20 and 22.

It will be noted, as indicated above, that while the device will operate and perform successfully with only one pair of hoses located in front of the spindles, the device performs more successfully using double pairs of hoses, each hose of each pair being mounted on a pivotally adjustable plate, the pairs of plates being located on each side of the spindle slot, the first pair of hoses being positioned approximately at the front of the shield, and the second pair of hoses being located about midway of the shield.

The above description and drawings disclose a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. In a cotton treating machine including the usual picking mechanism, said machine having a pair of shields, means comprising a pair of flexible hoses, each hose having a free end and means mounting the opposite end of each hose on one of said shields, said last named means comprising an adjustable plate located beneath said shield.

2. In a cotton treating machine including the usual picking mechanism, said machine having a pair of guides, means comprising a pair of flexible hoses, each hose having a free end and means mounting the opposite end of each hose on one of said guides, said last named means comprising a plate located beneath said guide.

3. The structure of claim 1 wherein said means mounting each plate comprises a pin extending from said plate to the underside of one of said shields.

4. The structure of claim 2 wherein the means mounting each plate comprises a pin extending from said plate to the underside of one of said guides.

5. The structure of claim 3 wherein said plate is provided with a pin whereby to receive one end of its hose in sleeved relationship, and clamping means for clamping said hose on said pin.

6. The structure of claim 4 wherein said plate is provided with a pin whereby to receive one end of its hose in sleeved relationship, and clamping means for clamping said hose on said pin.

7. The structure of claim 4 including a second pair of hose members mounted rearwardly from said first hose members, each of said second hose members having a free end and an end attached to said guide members.

References Cited in the file of this patent

UNITED STATES PATENTS

| | | |
|---|---|---|
| 515,031 | Turner | Feb. 20, 1894 |
| 685,443 | Campbell | Oct. 29, 1901 |
| 1,713,398 | Roundtree | May 14, 1929 |
| 2,140,631 | Johnston | Dec. 20, 1938 |
| 2,821,057 | Campbell et al. | Jan. 28, 1958 |
| 2,999,349 | Nichols | Sept. 12, 1961 |